(12) United States Patent
Cantemir

(10) Patent No.: US 6,820,707 B1
(45) Date of Patent: Nov. 23, 2004

(54) TWO MOTOR ELECTRIC AXLE

(75) Inventor: Codrin-Gruie Cantemir, Columbus, OH (US)

(73) Assignee: The Ohio State University Research Foundation, Columbus, OH (US)

(*) Notice: Subject to any disclaimer, the term of this patent is extended or adjusted under 35 U.S.C. 154(b) by 0 days.

(21) Appl. No.: 10/161,093

(22) Filed: Jun. 3, 2002

(51) Int. Cl.⁷ .................................................. B60K 1/00
(52) U.S. Cl. ...................................................... 180/65.6
(58) Field of Search ........................... 180/6.28, 6.48, 180/6.5, 234, 245, 246, 65.1, 65.6, 65.8

(56) References Cited

U.S. PATENT DOCUMENTS

| | | | | |
|---|---|---|---|---|
| 791,180 | A | * 5/1905 | Cantono | 180/6.28 |
| 1,984,830 | A | * 12/1934 | Higley | 475/21 |
| 3,162,471 | A | 12/1964 | Mazziotti | 287/87 |
| 3,263,447 | A | 8/1966 | Baker | 64/21 |
| 3,359,757 | A | 12/1967 | Adams | 64/8 |
| 3,799,284 | A | * 3/1974 | Hender | 180/65.2 |
| 3,961,497 | A | 6/1976 | Cohen | 64/21 |
| 4,357,810 | A | 11/1982 | Kumpar | 464/8 |
| 4,449,956 | A | 5/1984 | Ueno | 464/149 |
| 4,588,388 | A | 5/1986 | Chivari | 464/69 |
| 4,597,745 | A | 7/1986 | Orian | 464/173 |
| 4,664,393 | A | 5/1987 | Hazebrook | 277/174 |
| 4,693,699 | A | 9/1987 | Gregerson | 464/133 |
| 4,734,081 | A | 3/1988 | Neathery et al. | 464/71 |
| 5,035,677 | A | 7/1991 | Kanamaru et al. | 464/138 |
| 5,168,946 | A | * 12/1992 | Dorgan | 180/6.44 |
| 5,429,543 | A | * 7/1995 | Tilbor et al. | 446/456 |
| 5,443,130 | A | * 8/1995 | Tanaka et al. | 180/65.6 |
| 5,497,844 | A | * 3/1996 | Fritzinger | 180/65.6 |
| 5,586,939 | A | 12/1996 | Swinney | 464/106 |
| 5,667,420 | A | * 9/1997 | Menow et al. | 446/433 |
| 6,024,182 | A | * 2/2000 | Hamada et al. | 180/6.28 |
| 6,244,962 | B1 | * 6/2001 | Bacher et al. | 464/68 |

FOREIGN PATENT DOCUMENTS

JP      2-306828      * 12/1990

* cited by examiner

Primary Examiner—Bryan Fischmann
(74) Attorney, Agent, or Firm—Standley Law Group LLP

(57) ABSTRACT

An electric motor axle assembly comprising an electric motor; a gear shaft; and an output shaft. The electric motor having a pinion shaft extending therefrom. The electric motor is adapted to rotate the pinion shaft about a first axis. The pinion shaft comprising a pinion gear. The gear shaft defining a second axis at least substantially parallel to the first axis. The gear shaft having disposed thereon a first gear and a second gear such that rotation of the gear shaft about the second axis induces rotation in the first gear and in the second gear. The first gear is adapted to engage the pinion gear. The output shaft defining a third axis. The third axis is at least substantially parallel to the first axis and the second axis. The output shaft comprising a third gear. The third gear is adapted to engage the second gear. The output shaft comprising at least a portion of a constant velocity joint. The present invention also includes a two-motor electric axle and vehicles comprising same.

15 Claims, 13 Drawing Sheets

TWO MOTOR ELECTRIC AXLE

TECHNICAL FIELD OF THE INVENTION

The present invention is in the field of electric vehicles. Specifically, the present invention is related to electric motor axle assemblies used in electric vehicles.

BACKGROUND OF THE INVENTION

Electric traction motors (including induction machines) have been in development for over one hundred years. Primary development has been for railways, for both heavy (600–1500 kW) and light traction (100–400 kW) applications. Due to the significant development, the traction motor family is probably the most advanced with regards to technology and performance. Generally, the global requirements for a traction motor focus on power range, specific power, quality of supply, vibrations, temperature range, geometry etc. and the performance in these areas illustrates the huge developmental effort that has been undertaken.

However, for off-road severe-duty applications, a new constraint has to be considered in the design process. The traction motor must develop very large torque at low speed and still maintain significant power at high speed. For this application the extremes of high torque/low speed and high power/high speed are more demanding than in a rail application. Thus, it becomes extremely clear that a new class of traction motors must be developed. Specific constraints concerning weight and allowable geometry further complicate the issue and an "of the shelf" solution does not exist yet. However, reconsideration of the pole switch variation method in light of today's technology has provided an answer to this problem. Generally speaking, pole switch variation is a very old method (not in use today) but we consider that a combination between this method and modem inverter control in conjunction with state of the art electric machine technologies can match 100% of the severe-heavy duty vehicle requirements.

SUMMARY OF THE INVENTION

The present invention includes: (a) an electric motor axle assembly; (b) vehicles comprising an electric motor axle assembly; (c) a two-motor electric axle assembly; and (d) vehicles comprising a two-motor electric axle assembly.

In broadest terms, an electric motor axle assembly of the present invention comprises an electric motor; a gear shaft; and an output shaft. The electric motor has a pinion shaft extending therefrom. The electric motor is adapted to rotate the pinion shaft about a first axis. The pinion shaft comprises a pinion gear. The gear shaft defines a second axis at least substantially parallel to the first axis. The gear shaft has disposed thereon a first gear and a second gear such that rotation of the gear shaft about the second axis induces rotation in the first gear and in the second gear. The first gear is adapted to engage the pinion gear. The output shaft defines a third axis at least substantially parallel to the first axis and the second axis. The output shaft comprises a third gear. The third gear is adapted to engage the second gear. The output shaft comprises at least a portion of a constant velocity joint.

It is preferred that the electric motor axle assembly further comprises a brake mechanism. The brake mechanism is disposed along the first axis. That is to say, when activated the brake mechanism is capable of stopping the rotation of the pinion shaft caused by the electric motor.

It is further preferred that the electric motor axle assembly comprises a drive shaft. The drive shaft comprises a first end and a second end. The first end of the drive shaft is coupled to the constant velocity joint such that rotation of the output shaft induces rotation of the drive shaft. It should be noted that depending upon the type of constant velocity joint used, components of the joint may necessarily be disposed on the first end of the drive shaft with the remainder of the components disposed in the output shaft. A preferred constant velocity joint is a three-ball trunnion style CV-joint.

It is even more preferred that the electric motor axle assembly further comprises a second constant velocity joint functionally coupled with the second end of the drive shaft.

The present invention includes vehicles comprising at least one electric motor axle assembly as discussed above.

In broadest terms, a two-motor electric axle assembly of the present invention comprises a first electric motor assembly and a second electric motor assembly. The first electric motor assembly and the second electric motor assembly are arranged such that their respective output shafts are aligned with one another along an axis. The elements of the first and second electric motor assemblies are arranged so as to permit the two assemblies to be so aligned without mechanical interference from each other. It is most preferred that the first electric motor assembly and the second electric motor assembly are nested with respect to each other such that the first electric motor at least partially extends over the second output shaft and such that the second electric motor at least partially extends over the first output shaft.

The first electric motor assembly comprises a first electric motor; a first gear shaft, and a first output shaft. The first electric motor has a first pinion shaft extending therefrom. The first electric motor is adapted to rotate the first pinion shaft about a first axis. The first pinion shaft comprises, a first pinion gear. The first gear shaft defines a second axis at least substantially parallel to the first axis. The first gear shaft has disposed thereon a first gear and a second gear such that rotation of the first gear shaft about the second axis induces rotation in the first gear and in the second gear. The first gear is adapted to engage the first pinion gear. The first output shaft defines a third axis. The third axis is at least substantially parallel to the first axis and the second axis. The first output shaft comprises a third gear. The third gear is adapted to engage the second gear. The first output shaft may comprise at least a portion of a first constant velocity joint.

The second electric motor assembly comprises a second electric motor; a second gear shaft; and a second output shaft. The second electric motor has a second pinion shaft extending therefrom. The second electric motor is adapted to rotate the second pinion shaft about a fourth axis. The second pinion shaft comprises a second pinion gear. The second gear shaft defines a fifth axis at least substantially parallel to the fourth axis. The second gear shaft has disposed thereon a fourth gear and a fifth gear such that rotation of the second gear shaft about the fifth axis induces rotation in the fourth gear and in the fifth gear. The fourth gear is adapted to engage the pinion gear. The second output shaft is disposed along the third axis. The third axis being at least substantially parallel to the fourth axis and the fifth axis. The second output shaft comprises a sixth gear. The sixth gear is adapted to engage the fifth gear. The second output shaft comprises at least a portion of a second constant velocity joint.

It is preferred that the two-motor electric axle assembly further comprises a first brake mechanism. The first brake mechanism is disposed along the first axis. The first brake mechanism is adapted to brake the first electric motor.

It is even more preferred that the two-motor electric axle assembly further comprises a second brake mechanism. The second brake mechanism is disposed along the fourth axis. The second brake mechanism is adapted to brake the second electric motor.

It is more preferred that the two-motor electric axle assembly further comprise a first drive shaft. The first drive shaft comprises a first end and a second end. The first end of the first drive shaft is coupled to the first constant velocity joint such that rotation of said first output shaft induces rotation of said first drive shaft. It should be noted that depending upon the type of constant velocity joint used, components of the joint may necessarily be disposed on the first end of the drive shaft with the remainder of the components disposed in the output shaft. A preferred constant velocity joint is a three-ball trunnion style CV-joint.

It is most preferred that the two-motor electric axle assembly further comprises a third constant velocity joint. The third constant velocity joint is functionally coupled with the second end of the first drive shaft.

It is more preferred that the two-motor electric axle assembly further comprise a second drive shaft. The said second drive shaft comprises a first end and a second end. The first end of the second drive shaft is coupled to the second constant velocity joint such that rotation of the second output shaft induces rotation of the second drive shaft. It should be noted that depending upon the type of constant velocity joint used, components of the joint may necessarily be disposed on the first end of the drive shaft with the remainder of the components disposed in the output shaft. A preferred constant velocity joint is a three-ball trunnion style CV-joint.

It is most preferred that the two-motor electric axle assembly further comprises a fourth constant velocity joint. The fourth constant velocity joint is functionally coupled with said second end of the second drive shaft.

The present invention also includes vehicles comprising at least one two-motor electric axle assembly as discussed above.

DETAILED DESCRIPTION OF THE PREFERRED EMBODIMENT(S)

In accordance with the foregoing summary, the following presents a detailed description of the preferred embodiment of the invention that is currently considered to be the best mode.

The present invention uses a hybrid series configuration and is based on independent wheel drive, suspension and steering concepts. Thus, there are two electric traction motors per axle assembly able to provide truly independent All-Wheel Drive, allowing the vehicle to turn around in one place by having one or more wheels turning in a first direction while the remaining wheels turning an opposite direction.

The use of individually driven wheels renders traditionally optional automatic traction control and anti-lock braking systems standard. Additionally, each wheel's torque may be controlled to within 0.1 percent accuracy of the maximum torque. This control may be based on a variety of inputs (i.e., load sense, speed, and real-time dynamics) and may provide capabilities that we are just starting to explore. Individually driven wheels, coupled with the enhanced mobility associated with all-wheel steering systems, allow for unprecedented control of the vehicle dynamics, thereby opening the door for improved control in traditionally uncontrollable situations. Furthermore, the traction system can instantaneously limit transmission torque. Consequently, the transmission components such as drive shafts, CV-joints, gears and axles can have increased mean time before failure (MTBF), and the possibility of an unpredictable failure is correspondingly reduced.

However, the classic configuration used in severe-heavy duty application is not adequate for the control strategy and/or configuration of the present invention. The present invention provides a totally new axle concept able to meet and/or exceed all four design inputs, power density, allowable geometry, dynamics capabilities and a motor's characteristic transfer requirements.

Figure 1:
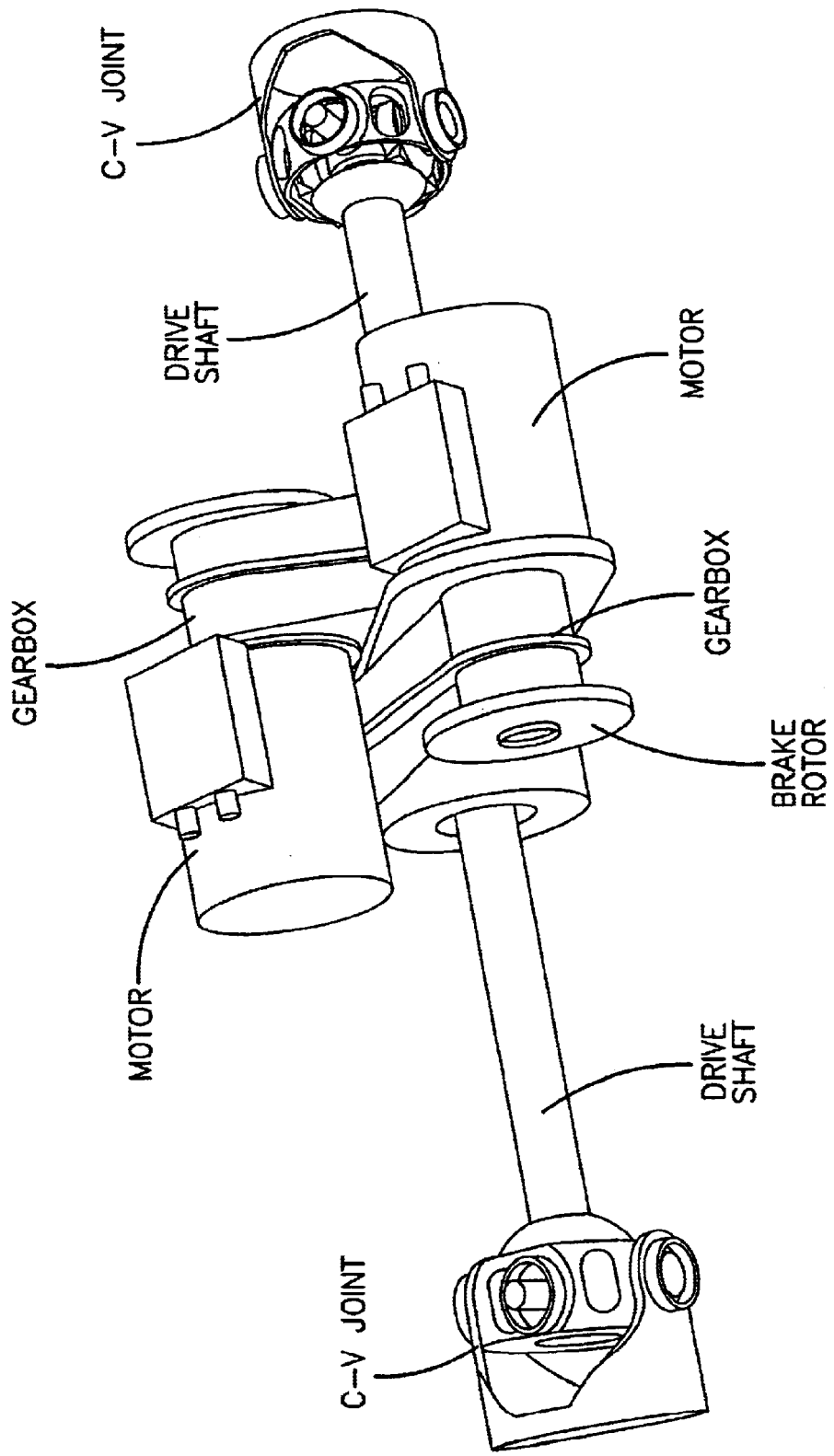
FIG. 1 provides a general overview of the two-motor electric axle assembly of the present invention.
Figure 2:
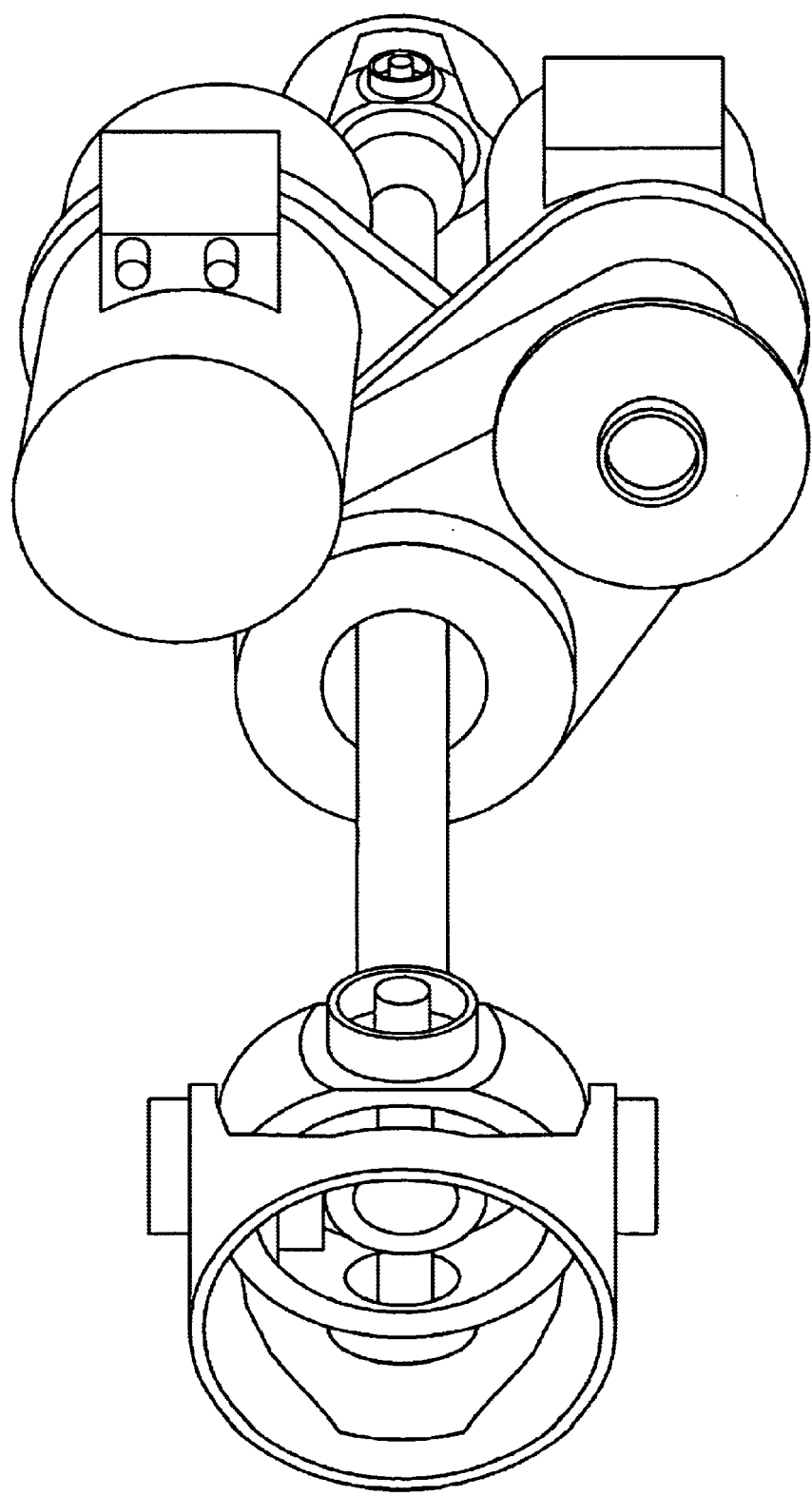
FIG. 2 provides a lateral view of the two-motor electric axle assembly shown in FIG. 1.

FIG. 1 shows a general overview of the two-motor electric axle assembly. As can be readily seen from FIG. 1, the two-motor electric axle assembly comprises two electric motor axle assemblies arranged so as not to interfere with one another and so as to align them along the third axis (along which their respective output shafts are aligned). FIG. 2 shows a side view of the two-motor electric axle assembly shown in FIG. 1. As shown, each motor drives a wheel via a gearbox and a drive shaft. For a wide range of applications, the drive shaft is directly coupled to the wheel. However, if the torque demand at the wheel is high, the axle can include an in-hub gear reduction.

Axle Presentation: General Overview

As can be seen in FIGS. 1 and 2, the brakes and the motors are located in the most upper position for better protection. The transversal section of the axle is a 60 to 90 degrees "V" configuration, depending on the motor power and gear ratio. The output shafts of both gearboxes are coaxial and for certain applications could be also be coaxial with the wheel hub (in static position). The present invention provides an axle design capable of "nesting" two transmissions in a "V" configuration thereby providing a complete axle (see FIG. 1).

Gearbox Configuration

Figure 3:
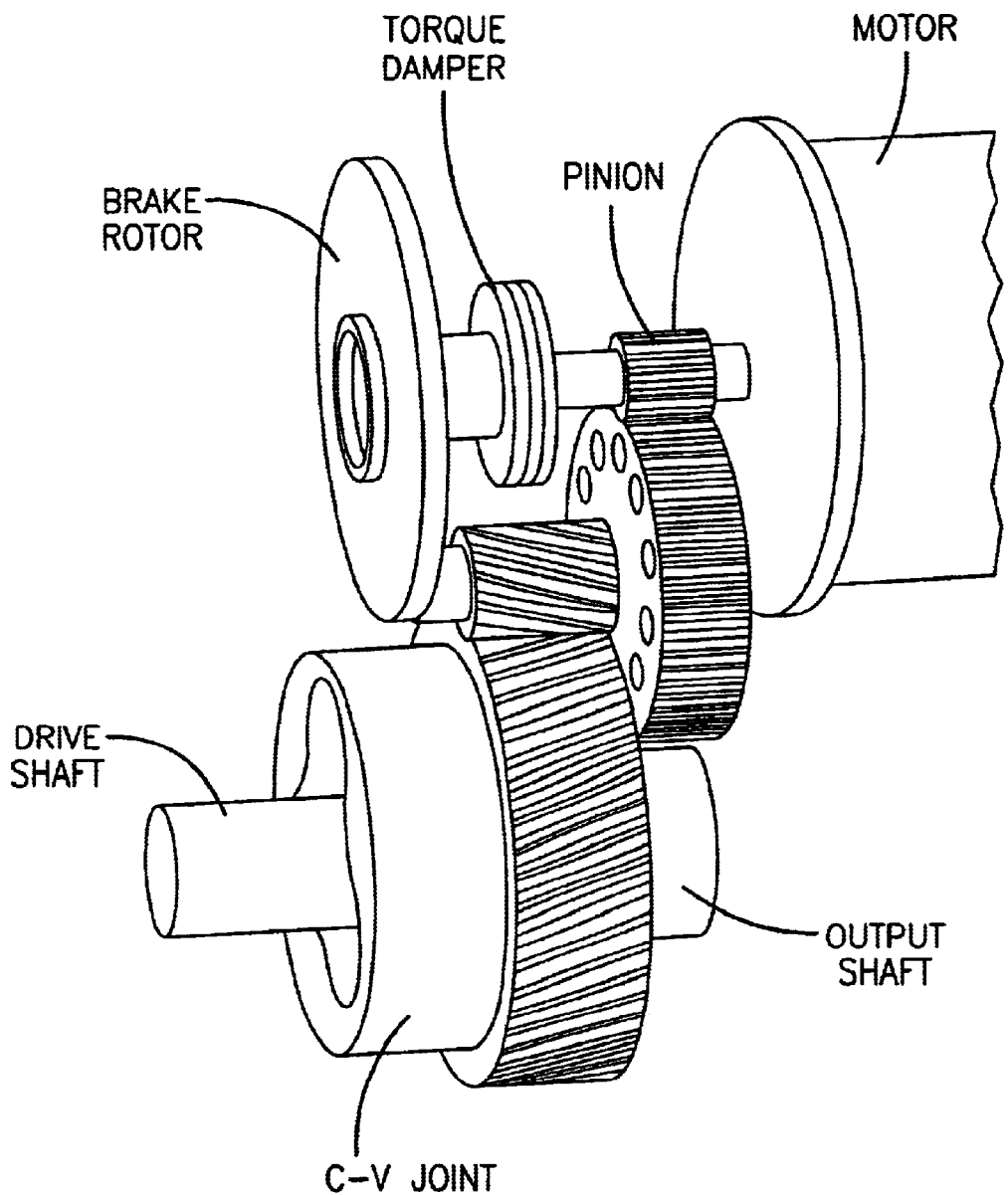
FIG. 3 illustrates the gearbox configuration.

FIG. 3 shows the gearbox configuration. The gearbox configuration is a compact double-stage speed-reduction unit with cylindrical gears designed to perform under maximum load with minimum dimension, weight and price. The first stage is coupled at the motor shaft via a torsion shaft and a torque damper. The pinion shaft has a hollow configuration and is traversed by the torsion shaft. A pressurized lubrication system is designed for the pinion, the brake rotor and the motor bearing and for the pinion lubrication.

Figure 4:
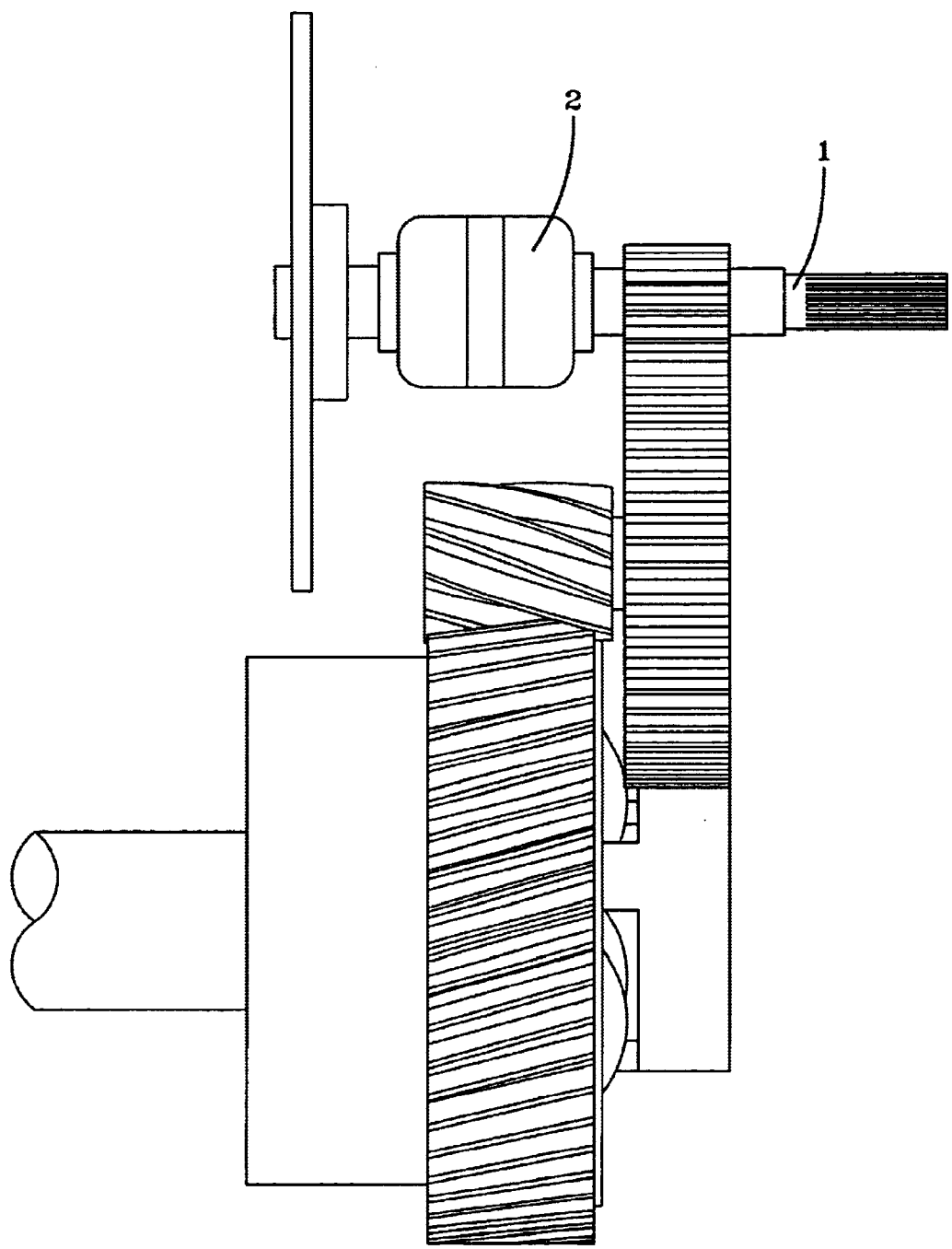
FIG. 4 shows the input shaft (torsion shaft) extending inside the hollow pinion shaft thereby connecting the brake mechanism with the electric motor.

As shown in FIG. 4, the brake rotor is coupled directly to the torque damper. The brake mechanism comprises the brake rotor, the torque damper, and the torsion shaft. The torsion shaft 1 extends inside of the pinion shaft so as to engage the motor during braking. The brake rotor and the motor are kinematically coupled in the gearbox by a single torque damper 2.

Drive Line

Figure 5:
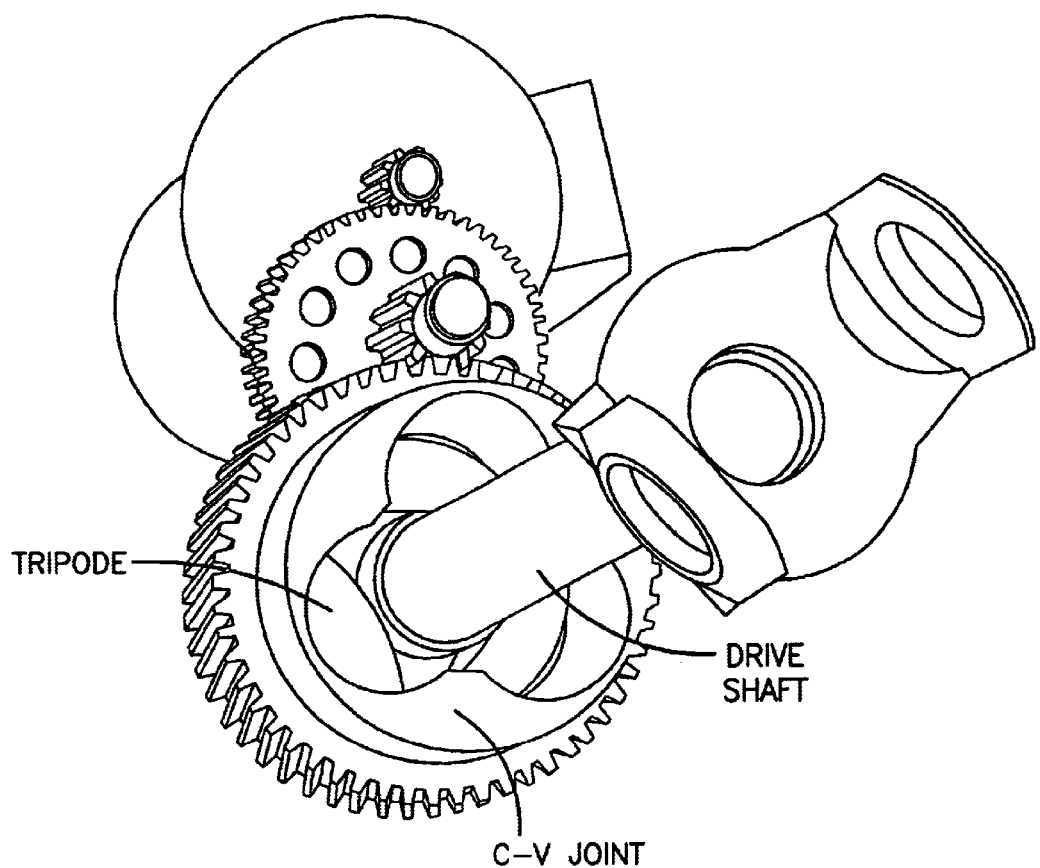
FIG. 5 shows the constant-velocity (CV) joint assembly for a three-ball trunion (tripod) bearing configuration.

As part of the present invention, one transmission CV joint is built inside the gearbox output shaft. This allows for the utilization of a longer drive shaft than in the classical system. Moreover, it allows for increased load capacity for the CV-joint because of better lubrication provided by oil. FIG. 5 shows the CV-joint assembly for a three-ball trunnion (tripod) bearing configuration. Regardless of the CV-joint type, the present invention can use high torque, high axial elongation CV-joints, able to handle heavy-duty operation without in hub reduction.

CV Joint

Figure 6:
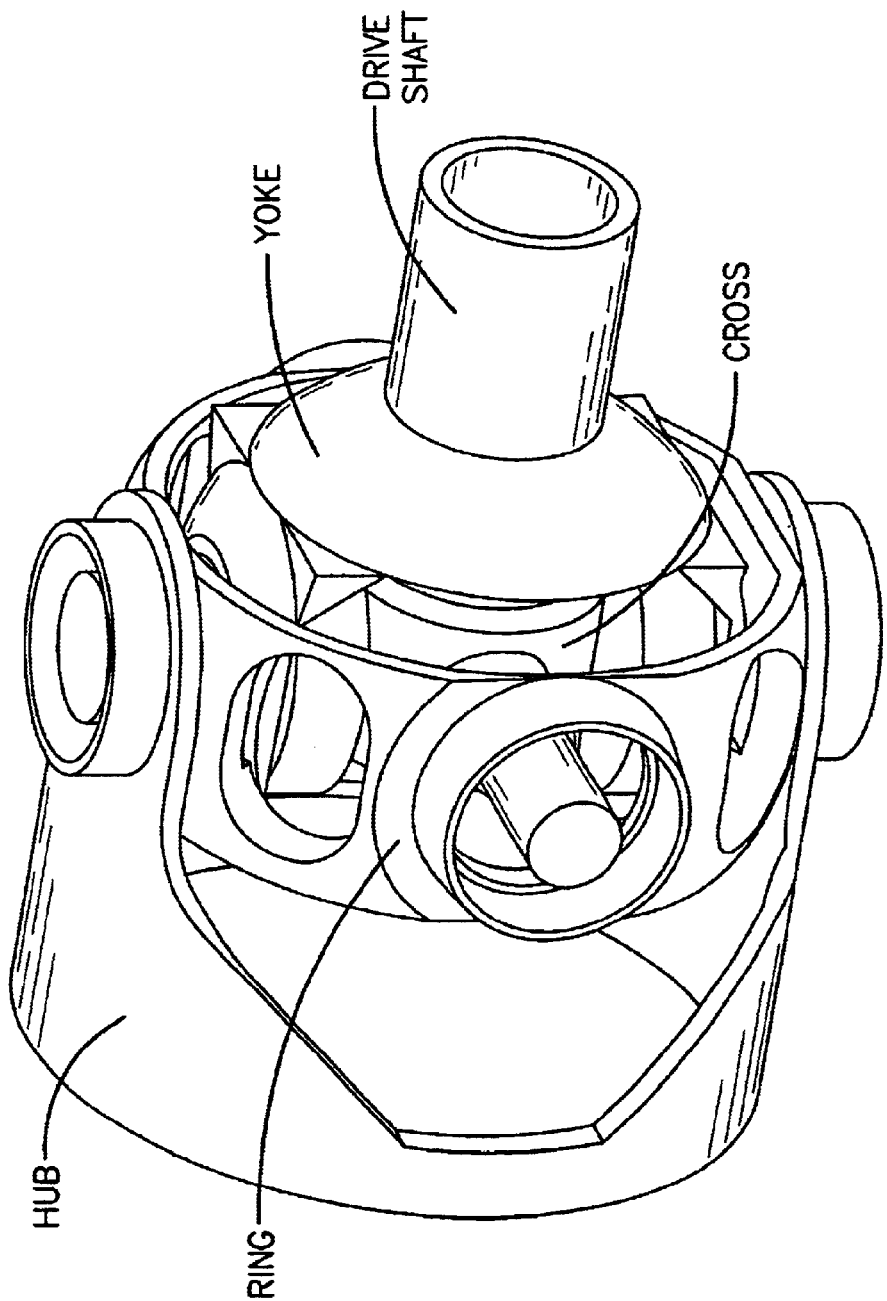
FIG. 6 shows a compact CV-joint configuration that may be employed at the wheel.
Figure 7:
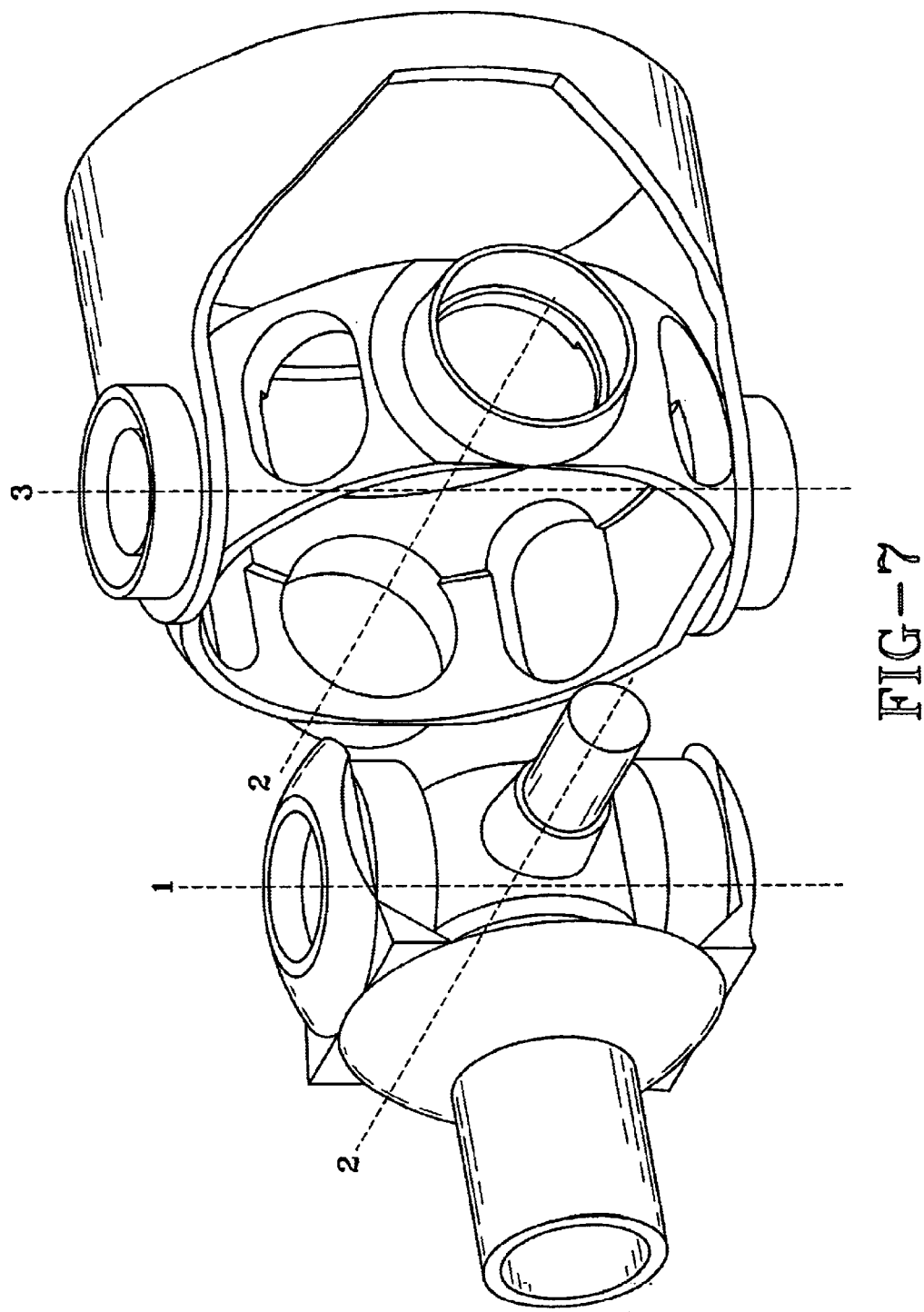
FIG. 7 provides an exploded view of the components of the compact CV-joint configuration provided in FIG. 6.
Figure 8:
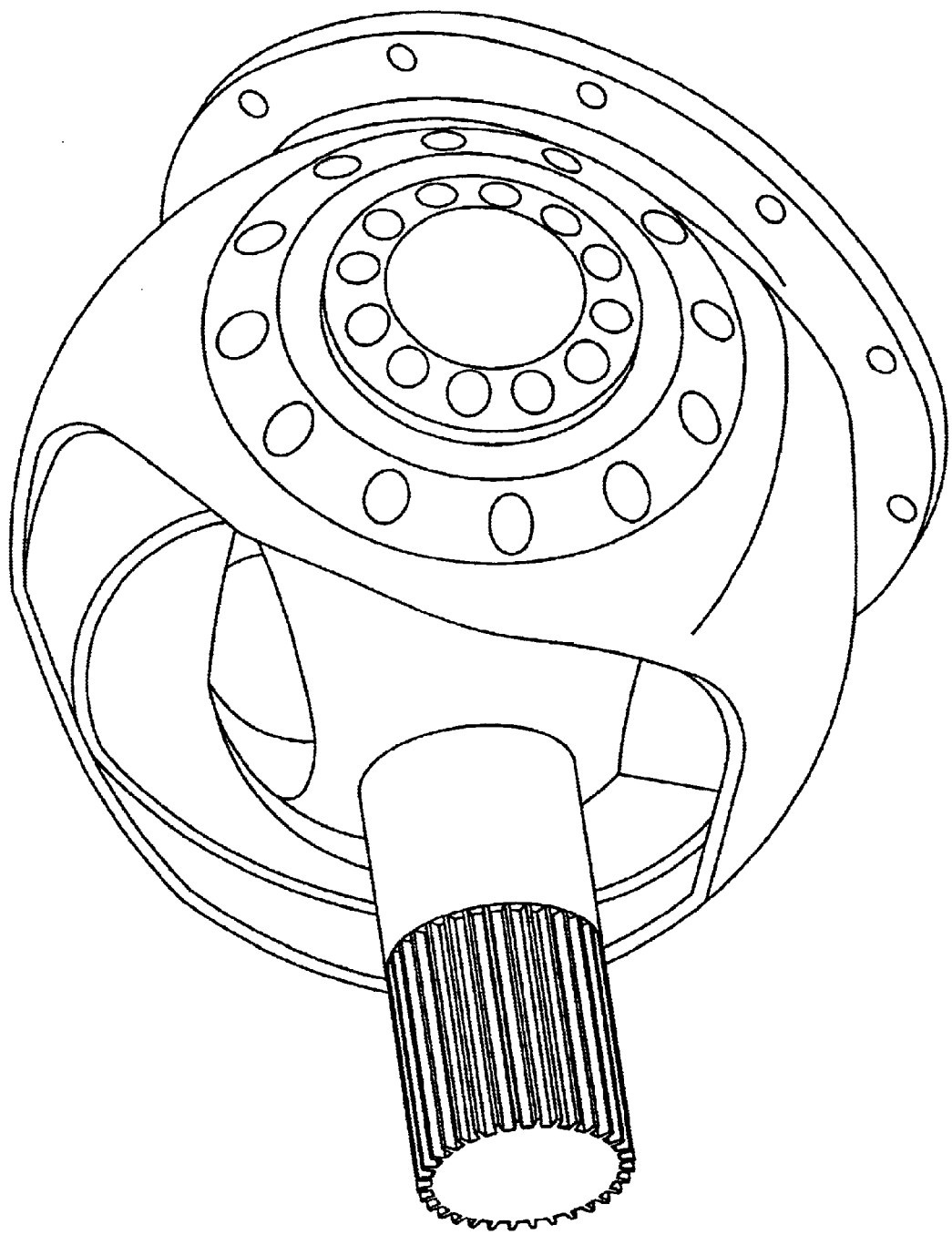
FIG. 8 details a three-axis compact CV-joint designed for applications without in-hub reduction.

FIG. 6 shows a possible (wheel) compact CV-joint configuration. The CV-joint is based on a double Cardan joint ("U" joint) where one of the joints supports a topological transformation. Thus, one cross becomes a ring and the second cross is built inside the ring yielding a compact joint. The entire joint assembly is built inside the wheel hub and shares common lube with the wheel bearings. According to the application and/or technologies, the two Cardan joints may have or may not have a common axle. FIG. 7 provides an exploded view of the compact CV-joint shown in FIG. 6. The components shown in FIG. 7 include the yoke, the cross, the ring, and the hub. The yoke connects to the drive shaft and the hub connects one of the vehicle's wheels. The three axis lines drawn in FIG. 7 (1, 2, and 3) indicate the axis of rotation for the various components. FIG. 8 shows a three-axis compact CV-joint designed for applications without in-hub reduction. It is preferred that the CV-joint be able to transfer a peak torque of 60.000 Nm at 300 rpm with 45 degrees between input and output shafts. The maximum steering angle could be set up to 60 degrees.

Traction Motor: Pole Switch Variation Method

As previously mentioned, pole switch variation it is a well-known solution proposed at the start of the 20th century. That solution was used in industrial applications and devices where two or three speeds were sufficient, sometimes in combination with a mechanical gearbox. However, these devices were only able to function at a few fixed speed settings.

The present invention relies on a different method where pole switch variation is used together with voltage and frequency regulation to obtain an extended area of the traction effort (brake)/speed characteristics. For this reason, the pole switch is not obtained like in classical application with mechanical devices but is obtained only from inverter control. Thus, two inverters must supply each motor (or group of motors), with each inverter having separate control.

Figure 9:
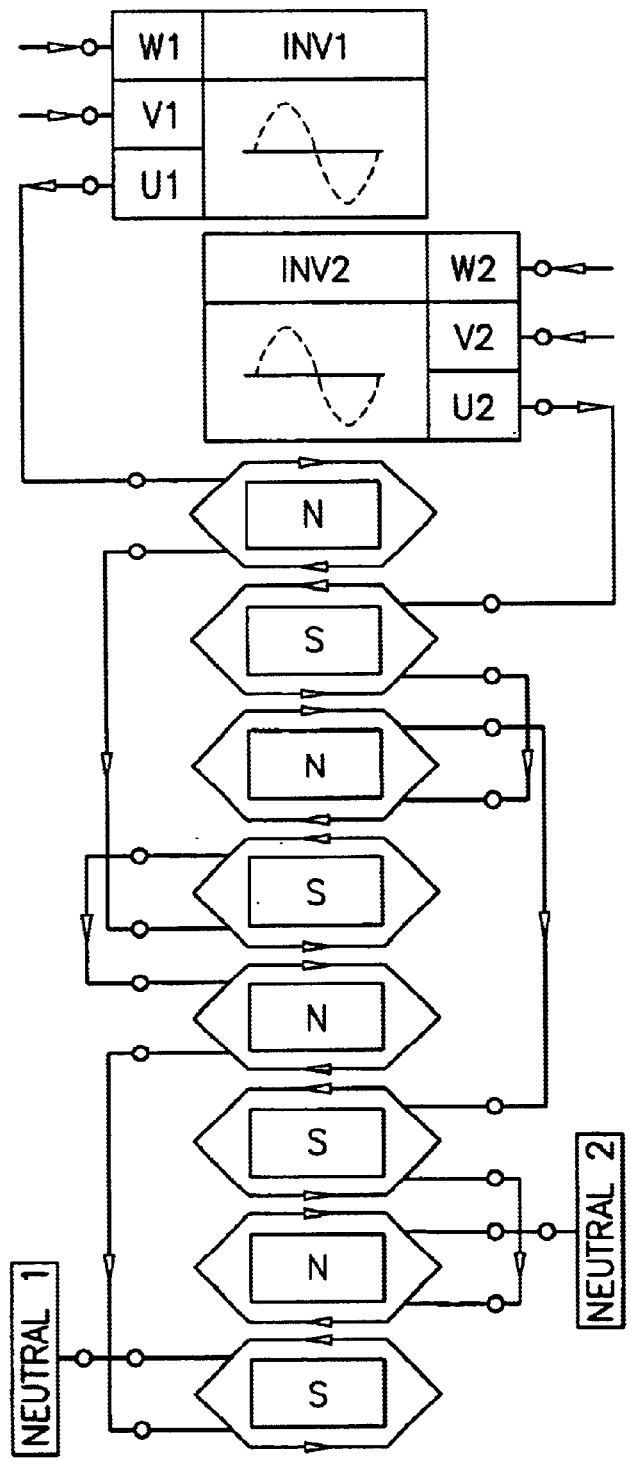
FIG. 9 provides the circuit diagram for an 8-pole AC machine.

FIG. 9 shows the circuit diagram for an 8-pole AC machine in accordance with a device of the present invention. For simplification in FIG. 9, only the first phase U1 and U2 of each inverter are presented. Basically, the electrical connection method consists in intercalating groups of two poles supplied from different inverters.

Figure 10:
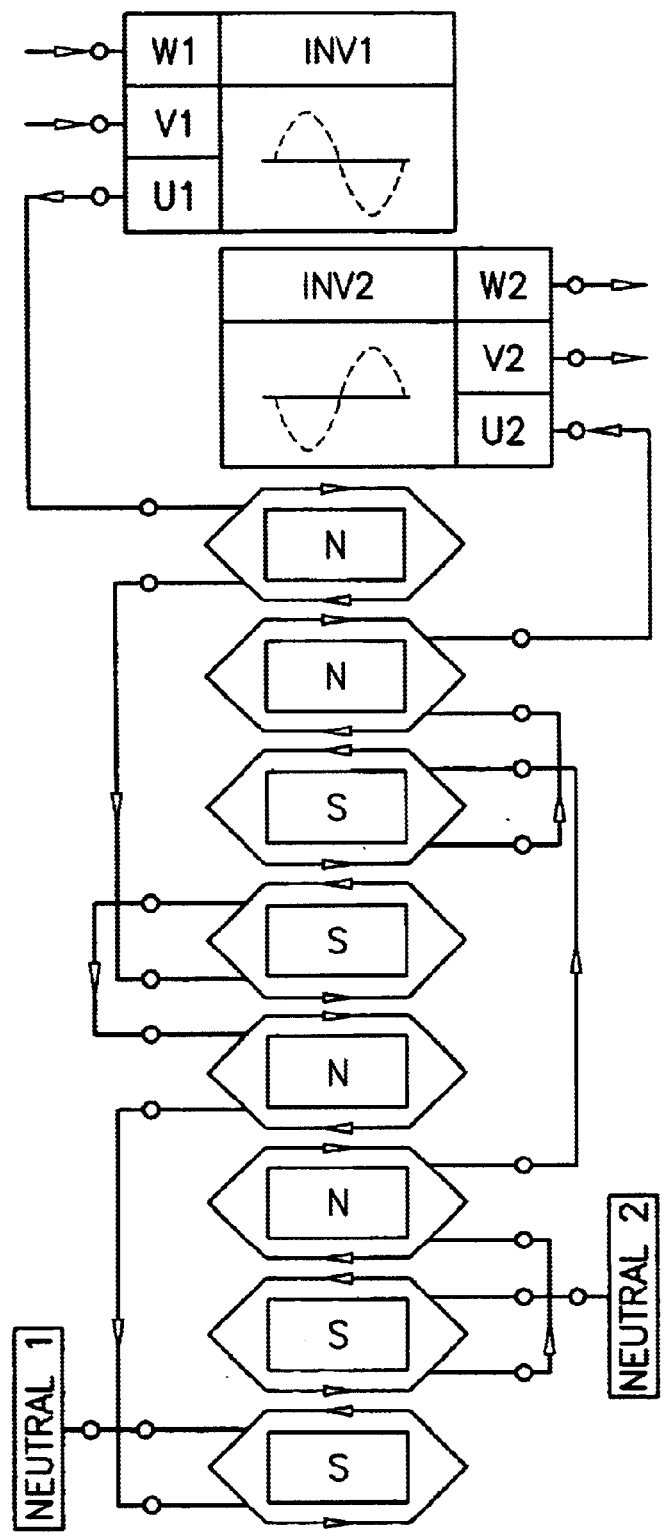
FIG. 10 shows the 8-pole AC machine supplied for a 4-pole function.
Figure 11:
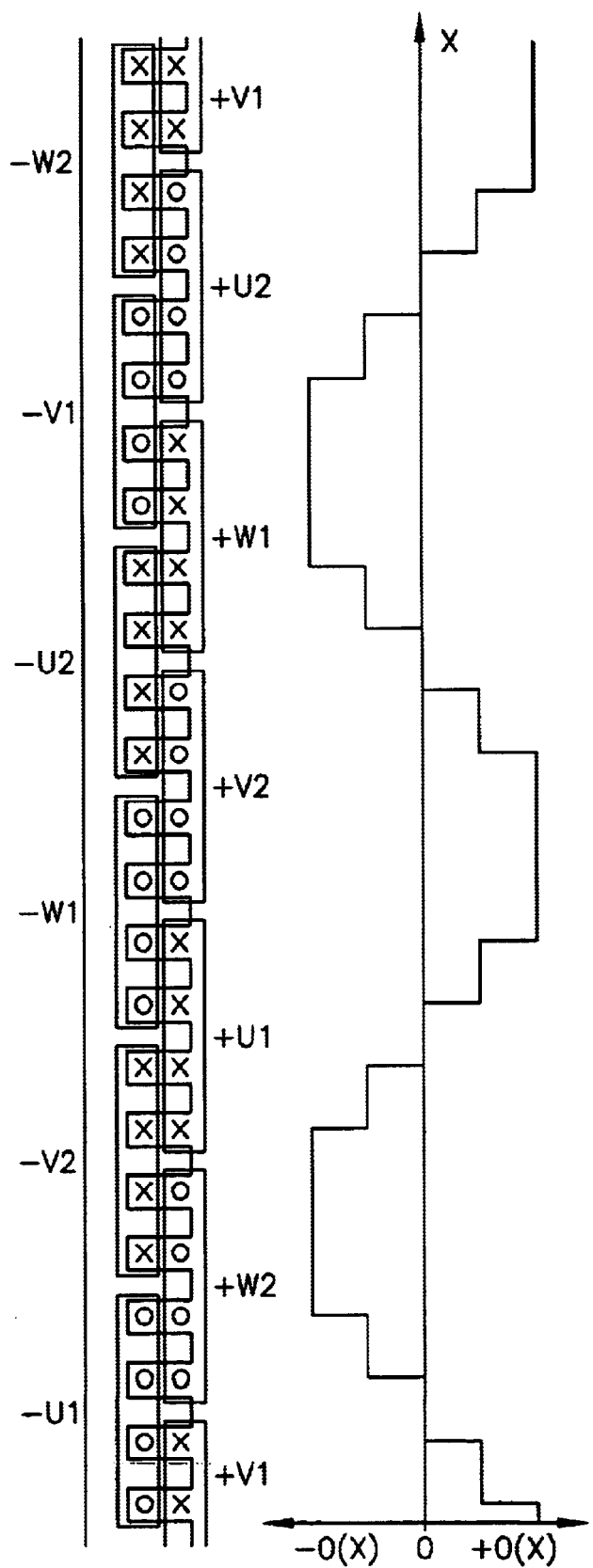
FIG. 11 shows one example of the phase's succession in the double layer windings of a 4-slot/phase/pole AC motor where the maximum number of poles are operating.
Figure 12:
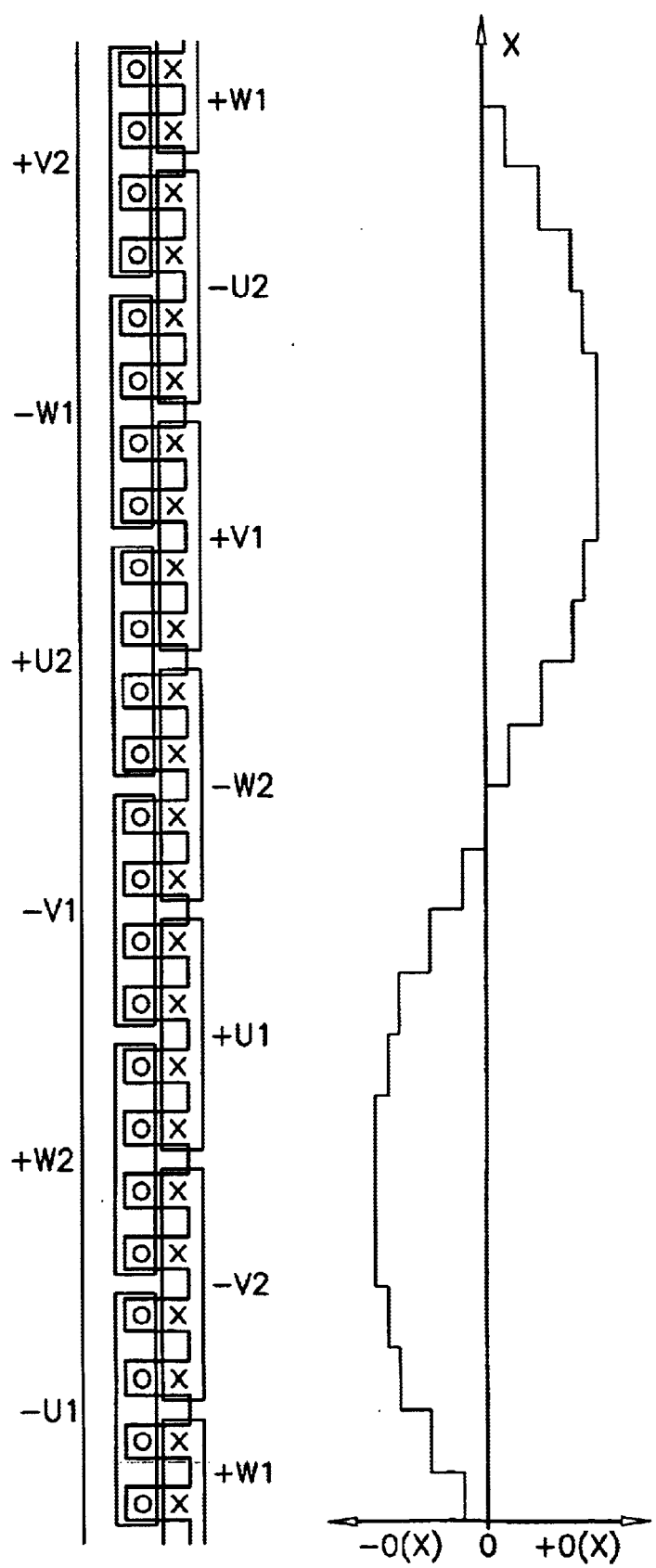
FIG. 12 shows an example of the phase's succession where the phase V was changed with phase W in case of both inverters and also 180-degree delay was operated for INV2.

For functioning with the maximum number of poles, the two inverters must have synchronous functioning and alternative pairs of pole succession are obtained. In this case, the magnetic poles correspond to the physical poles. When halving an poles is required, one of the inverter must introduce a 180-degree delay. FIG. 10 shows the 8-pole AC machine configured for 4-pole functioning. Concerning FIG. 10, one of the inverters (INV 2) operates with 180-degree delay and practically the current change the sense only in one half of motor. Thus, the succession between the physical poles is lost and each magnetic pole starts to be formed by two physical poles. Thus, the pole pitch is doubled as well as the synchronous speed. However, the torque is halved and the shaft-power at rest is almost the same. As has been shown, this method could reduce the pole number solely by inverter control. In both cases, the inverters must supply a three-phase balanced system. Also, to keep the same sense of operation it is necessary to change the order of two phases of both inverters together with the introduction of the 180-degree delay at INV 2. FIG. 11 shows one example of the phase's succession in the double layer windings of a 4-slot/phase/pole AC motor where the maximum number of poles is in operation. On the right side of FIG. 11 is plotted the theoretical flux distribution along the gap. Phases U1, V1 and W1 are supplied by INV 1 (FIG. 9 & FIG. 10) and phases U2, V2 and W2 are supplied by INV 2. Functioning with small number of poles is presented in FIG. 10, where phase V was swapped with phase W for both inverters and also the 180-degree delay was operated for INV 2. The normal succession of the phases is U-V-W in the case of both inverters.

The examples presented above should be considered only for orientation. A number of other combinations are possible in correlation with the winding type. We consider the most advantageous winding for a pole switch variation AC traction machine designed for severe-heavy duty application to be the variable geometry, single layer type.

Another very interesting alternative could be the winding "ring" type, especially for extreme applications where forced liquid cooling must bemused. This winding type is able to functioning with "fractioning" of the pole number allowing for unprecedented control of the vehicle dynamics.

Designing an AC traction machine with the same efficiency in both cases of functioning is either not possible or is not convenient, so in future application we must consider one case of functioning (low poles number or high poles number) preferential. However, pole switch variation is only a method to extend the area of the traction effort (brake)/speed characteristics and does not bring any advantage concerning power density. So, it seem to be extremely clear that in addition to the concept above presented, another element must become part of the new concept design.

Unconventional Technology

Besides the modifications to the AC machine fundamentals, one of the most powerful ways for improvements lies in the technology field. Typically, high performance materials could be used, with some improvements in the magnetic and/or electric performance of the machine.

Despite the available solutions, we believe that more performance can be obtained in the field of manufacturing technologies where most of the solutions (exception insulation) are the same from sixty years ago. However, high performance materials provide an easy to implement solution (without distorting any concept included in this paper) if they can be produced at reasonable price.

Variable Geometry Winding (VGW) is a completely new alternative to the classic machine manufacturing. Briefly, VGW involves the utilization of low turn number coils with different cross section areas and/or different cross section peripheries inside and outside the slot. The most important advantages of the technology are better use of the slot volume, better heat transfer behavior and smaller electric resistance.

Figure 13:
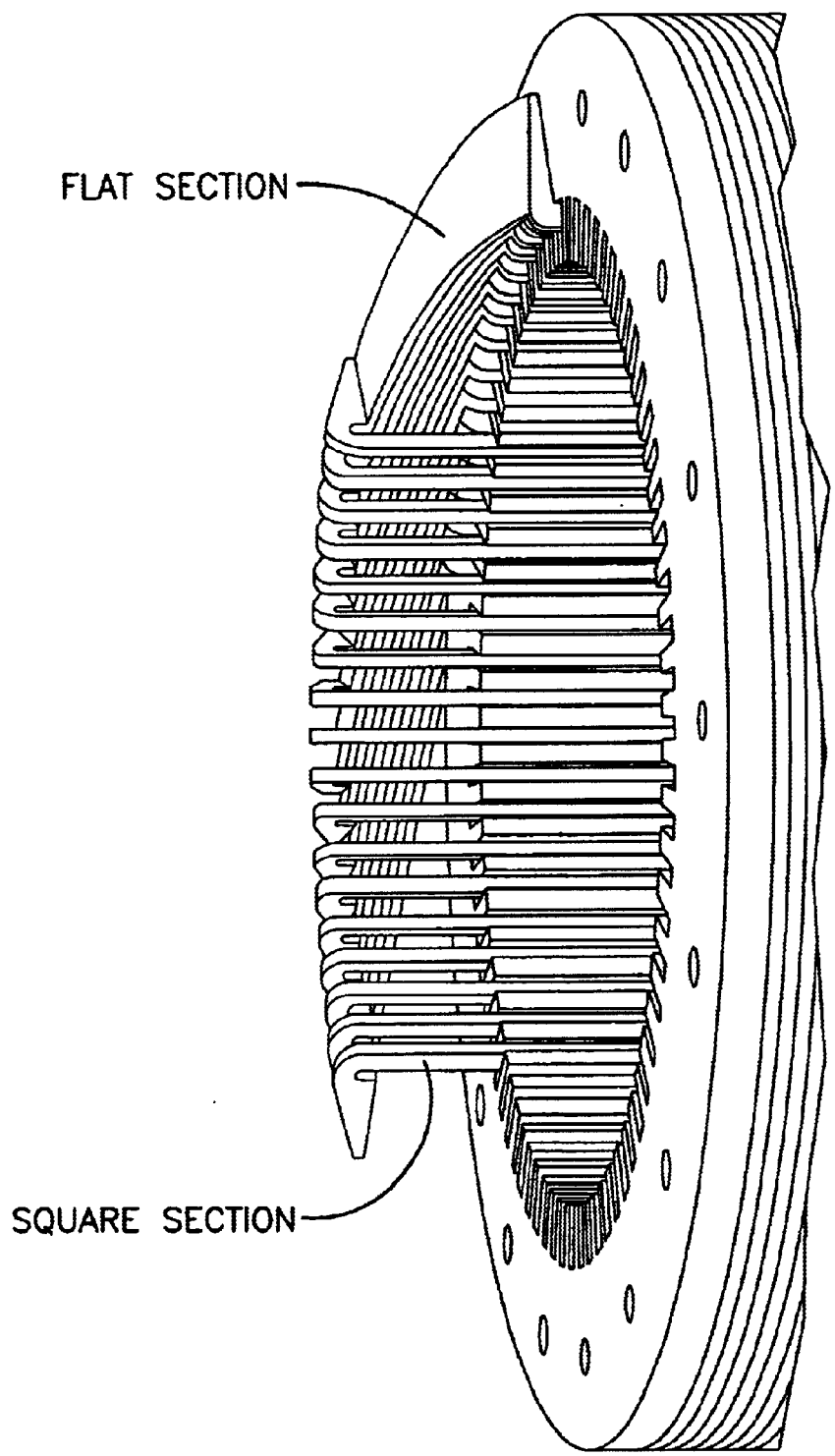
FIG. 13 shows a general view of a liquid (oil) cooling double layer variable geometry winding (VGW) for a 4/(8) pole, 6 slot/pole/phase 3-phase machine (rotor and three poles removed to improve view).

FIG. 13 shows a general view of a liquid (oil) cooling double layer VGW for a 4/(8) pole, 6 slot/pole/phase, 3-phase machine. As can be appreciated, double layer VGW is constructed from a plurality of pieces each comprising an axial portion having a square cross section and a circumferentially-disposed flat section. (For a better view the rotor and three poles were removed).

Inside the slot, the coil has an approximate square cross section with innovative technology insulation capable of safe operation up to 300% over-voltage. Outside of the slot a portion of the end coil becomes very flat to exploit certain advantages concerning heating dissipation and allowable geometry. Thus, the nominal current could be increased and for reasonable efficiencies the power density could be reach 1 kg/1 kW continuous rating.

Conclusions

We have presented a novel two-motor electric axle design and new AC traction motor/drive concept. The major accomplishments and results are summarized here:

- Electric traction represents a very promising solution for the next generation vehicle. Furthermore electric transmission can match 100% of the requirements of the severe-heavy duty applications if non-classic concepts are applied.
- Due the fact that the mechanical connection between power train and wheels is no longer a constraint in the design process, electric traction opens the door for completely new architectures in the drive lines/transmission concept.
- More advantageous and more efficient drive-lines, CV joints and gears can be developed. In-hub reduction is no longer the single solution available for severe-heavy duty applications.
- Better traction/brake flexibility can be achieved by using a pole switch variation method. Pole switch variation can be applied to severe-heavy duty applications by control techniques.
- 1 kg/1 kW at continuous rating becomes a reasonable goal if variable geometry windings are used.

While the invention has been described in connection with what is presently considered to be the most practical and preferred embodiments, it is to be understood that the invention is not to be limited to the disclosed embodiment(s), but on the contrary, is intended to cover various modifications and equivalent arrangements included within the spirit and scope of the appended claims, which are incorporated herein by reference.

What is claimed is:

1. An electric motor axle assembly, said electric motor axle assembly comprising:
   an electric motor, said electric motor having a pinion shaft extending therefrom, said electric motor adapted to rotate said pinion shaft about a first axis, said pinion shaft comprising a pinion gear;
   a gear shaft, said gear shaft defining a second axis at least substantially parallel to said first axis, said gear shaft having disposed thereon a first gear and a second gear such that rotation of said gear shaft about said second axis induces rotation in said first gear and in said second gear, said first gear adapted to engage said pinion gear; and
   an output shaft, said output shaft defining a third axis, said third axis being at least substantially parallel to said first axis and said second axis, said output shaft comprising a third gear, said third gear adapted to engage said second gear, said output shaft comprising at least a portion of a constant velocity joint, wherein said gear shaft and said output shaft are not coaxial with respect to one another.

2. The electric motor axle assembly according to claim 1 further comprising a brake mechanism disposed along said first axis.

3. The electric motor axle assembly according to claim 1 further comprising a drive shaft, said drive shaft comprising a first end and a second end, said first end of said drive shaft coupled to said constant velocity joint such that rotation of said output shaft induces rotation of said drive shaft.

4. The electric motor axle assembly according to claim 3 further comprising a second constant velocity joint, said second constant velocity joint functionally coupled with said second end of said drive shaft.

5. A vehicle comprising at least one electric motor axle assembly of claim 1.

6. The electric motor axle assembly according to claim 1 further comprising at least one active braking mechanism.

7. A two-motor electric axle assembly, said two-motor electric axle assembly comprising:
   a first electric motor assembly, said first electric motor assembly comprising:
      a first electric motor, said first electric motor having a first pinion shaft extending therefrom, said first electric motor adapted to rotate said first pinion shaft about a first axis, said first pinion shaft comprising a first pinion gear;
      a first gear shaft, said first gear shaft defining a second axis at least substantially parallel to said first axis, said first gear shaft having disposed thereon a first gear and a second gear such that rotation of said first gear shaft about said second axis induces rotation in said first gear and in said second gear, said first gear adapted to engage said first pinion gear; and
   a first output shaft, said first output shaft defining a third axis, said third axis being at least substantially parallel to said first axis and said second axis, said first output shaft comprising a third gear, said third gear adapted to engage said second gear, said first output shaft comprising at least a portion of a first constant velocity joint, wherein said first gear shaft and said first output shaft are not coaxial with respect to one another; and a second electric motor assembly, said second electric motor assembly comprising:
- a second electric motor, said second electric motor having a second pinion shaft extending therefrom, said second electric motor adapted to rotate said second pinion shaft about a fourth axis, said second pinion shaft comprising a second pinion gear;
- a second gear shaft, said second gear shaft defining a fifth axis at least substantially parallel to said fourth axis, said second gear shaft having disposed thereon a fourth gear and a fifth gear such that rotation of said second gear shaft about said fifth axis induces rotation in said fourth gear and in said fifth gear, said fourth gear adapted to engage said second pinion gear; and
- a second output shaft, said second output shaft disposed along said third axis, said third axis being at least substantially parallel to said fourth axis and said fifth axis, said second output shaft comprising a sixth gear, said sixth gear adapted to engage said fifth gear, said second output shaft comprising at least a portion of a second constant velocity joint, wherein said second gear shaft and said second output shaft are not coaxial with respect to one another; and wherein said first electric motor assembly and said second electric motor assembly are nested with respect to each other such that said first electric motor at least partially extends over said second output shaft and such that said second electric motor at least partially extends over said first output shaft.

8. The two-motor electric axle assembly according to claim 7 further comprising a first brake mechanism disposed along said first axis.

9. The two-motor electric axle assembly according to claim 8 further comprising a second brake mechanism disposed along said fourth axis.

10. The two-motor electric axle assembly according to claim 7 further comprising a first drive shaft, said first drive shaft comprising a first end and a second end, said first end of said first drive shaft coupled to said first constant velocity joint such that rotation of said first output shaft induces rotation of said first drive shaft.

11. The two-motor electric axle assembly according to claim 10 further comprising a third constant velocity joint, said third constant velocity joint functionally coupled with said second end of said first drive shaft.

12. The two-motor electric axle assembly according to claim 7 further comprising a second drive shaft, said second drive shaft comprising a first end and a second end, said first end of said second drive shaft coupled to said second constant velocity joint such that rotation of said second output shaft induces rotation of said second drive shaft.

13. The two-motor electric axle assembly according to claim 12 further comprising a fourth constant velocity joint, said fourth constant velocity joint functionally coupled with said second end of said second drive shaft.

14. A vehicle comprising at least one two-motor electric axle assembly of claim 7.

15. The two-motor electric axle assembly according to claim 7 further comprising at least one active braking mechanism.

* * * * *

UNITED STATES PATENT AND TRADEMARK OFFICE
CERTIFICATE OF CORRECTION

PATENT NO.   : 6,820,707 B1
DATED        : November 23, 2004
INVENTOR(S)  : Cantemir It is certified that error appears in the above-identified patent and that said Letters Patent is hereby corrected as shown below:

Column 2,
Line 33, please delete "comprises, a" and insert -- comprises a --.

Column 6,
Line 19, please delete "halving an poles" and insert -- halving poles --.
Line 55, please delete "bemused" and insert -- be used --.

Signed and Sealed this

First Day of March, 2005

JON W. DUDAS
*Director of the United States Patent and Trademark Office*